United States Patent [19]

Haverkamp et al.

[11] 4,397,624
[45] Aug. 9, 1983

[54] DEVICE FOR RENDERING A CABLE LONGITUDINALLY WATERTIGHT

[75] Inventors: Antonius P. Haverkamp, Alphen a/d RIJN; Klaas W. Kerkhof, Aalst-Waalre, both of Netherlands

[73] Assignee: U.S. Philips Corporation, New York, N.Y.

[21] Appl. No.: 315,702

[22] Filed: Oct. 28, 1981

[30] Foreign Application Priority Data

Oct. 30, 1980 [NL] Netherlands .......................... 8005951

[51] Int. Cl.$^3$ ............................ B29F 3/10; B29F 3/01
[52] U.S. Cl. ..................................... 425/113; 118/404; 118/405; 118/421; 425/117; 425/122; 425/126 R; 425/145; 425/150; 425/376 R
[58] Field of Search ........... 425/114, 113, 122, 129 R, 425/150, 13, 116, 117, 127, 145, 376 R, 381, 126; 118/404, 405, 421, DIG. 21; 427/434.7

[56] References Cited

U.S. PATENT DOCUMENTS

| 1,987,963 | 1/1935 | Malm | 425/113 |
| 2,790,412 | 4/1957 | Knapp et al. | 118/405 |
| 3,940,300 | 2/1976 | Priaroggia | 425/113 |
| 4,204,496 | 5/1980 | Ikegami et al. | 118/405 |

Primary Examiner—Willard E. Hoag
Attorney, Agent, or Firm—Norman N. Spain

[57] ABSTRACT

A device for rendering cables such as electric cables, telecommunication cables, optical cables, longitudinally watertight by the block-wise application of a sealing compound into the cable core by means of an intermittently displaceable nozzle which is periodically displaced by a driving element, the speed of the driving element being synchronized with the linear speed of the cable core.

6 Claims, 11 Drawing Figures

DEVICE FOR RENDERING A CABLE LONGITUDINALLY WATERTIGHT

The invention relates to a device for rendering a cable having a stranded core longitudinally watertight while said core is moving longitudinally by the blockwise application under pressure of sealing material in and around the stranded cable core said device comprising an injection head which can be intermittently displaced in the longitudinal direction of the cable by means of a guide in synchronism with the speed of advancement of the cable core and which also comprises a feed-through chamber which is connected to a supply duct for the sealing material, the supply of which is dosed by means of a supply valve.

In order to render cables including electric cables, telecommunication cables and optical cables, longitudinally watertight, the hollow spaces in the cable core are divided into compartments of the same length by means of a sealing material which adheres tightly to the conductors of the cable core as well as to the envelope and/or sheath surrounding the cable core. The division of the hollow spaces in the cable core into compartments serves to prevent moisture which penetrates into the cable core in the case of a damaged cable envelope from penetrating further in the longitudinal direction of the cable along the conductors, thus spreading through the entire cable. When such spreading of, for example, penetrated water is not prevented, the properties of the cable, such as capacitance cross-talk and mechanical lifetime are liable to be substantially reduced. Furthermore, the penetrated water can attack the conductors or glass fibers via small holes in the insulation of the individual conductors or fibers which are referred to as pin holes. Moreover, there is a risk that water which has penetrated as far as the connection sleeves causes short circuits between the individual transmission networks.

For the sealing material use can be made of, for example, a two component silicon rubber, which after having been mixed with several additives, acquires specific rheological properties. During the injection time the sealing material behaves like a Newtonian liquid with a low viscosity. Immediately after injection however the viscosity increases so that the compound does not penetrate further into the cable but stays in place, thus forming a watertight block.

A device of the kind set forth is known from German Patent Specification No. 1,665,525 published Mar. 18, 1971; the injection head of this known device is periodically taken along by the cable core due to frictional forces which are produced by the pressurized supply of the sealing material. This known device does not offer reliable and reproducible synchronization of the speeds of the cable core and the injection head. The acceleration of the injection head is dependent on the speed of the cable core and also on the pressure of the sealing material.

The invention has for its object to provide a device which is independent of frictional forces and by means of which a cable can be rendered longitudinally watertight in a reproducible manner, independently of the speed of the cable.

This object is achieved in accordance with the invention in that for the periodic controlled displacements of the injection head the device comprises a drive mechanism having a driving element which is coupled to the injection head and which is controlled by a pneumatic unit connected to a compressed air duct including a control valve.

The injection head is periodically displaced by means of the driving element in a forced, controlled movement in synchronism with the cable core to be rendered watertight. Synchronized control of the control valve in the compressed air duct and the supply valve for the dosing of the sealing material ensures that the injection head moves in synchronism with the cable core, i.e. is stationary with respect to the cable core, when the supply valve is open.

In an embodiment of the device in accordance with the invention which has a very simple mechanical construction, the driving element is constructed as a clamping mechanism which intermittently cooperates with the cable core to be rendered longitudinally watertight. This device provides a rigid coupling between cable core and injection head, and hence a purely mechanical displacement of the injection head, but at comparatively high speeds of the cable core, speed fluctuations are liable to occur in the cable.

Very smooth synchronization of the injection head and the cable core is obtained in a further embodiment of the device in accordance with the invention in that the driving element comprises a driven piston means of the pneumatic unit. Thanks to the pneumatic displacement of the injection head, fluctuations of the cable speed are prevented; the driving element does not contact the cable core.

A further embodiment of the device in accordance with the invention is characterized in that it comprises a throttling valve which is arranged in the compressed air duct between the control valve and the pneumatic unit and which is controlled by a wheel which senses the cable core. This embodiment enables fast and slow-reaction synchronization of injection head and cable core, even in the case of comparatively high speeds of the cable core.

In still another embodiment of the device, the throttling valve comprises a vent duct. If the starting speed of the driving element is much higher than the speed of the cable core, the starting speed will be very quickly reduced because the pneumatic unit is quickly vented via the vent duct of the throttling valve.

The injection head of a further embodiment of the device comprises a nozzle with a pressure chamber which is connected to the supply duct and which communicates with the feed-through chamber; thanks to these steps, the sealing material is fed up into the center of the cable core and is distributed evenly across the cross-section of the cable to form a watertight block.

The invention will be described in detail hereinafter with reference to the accompanying drawing. Therein:

Figure 1:
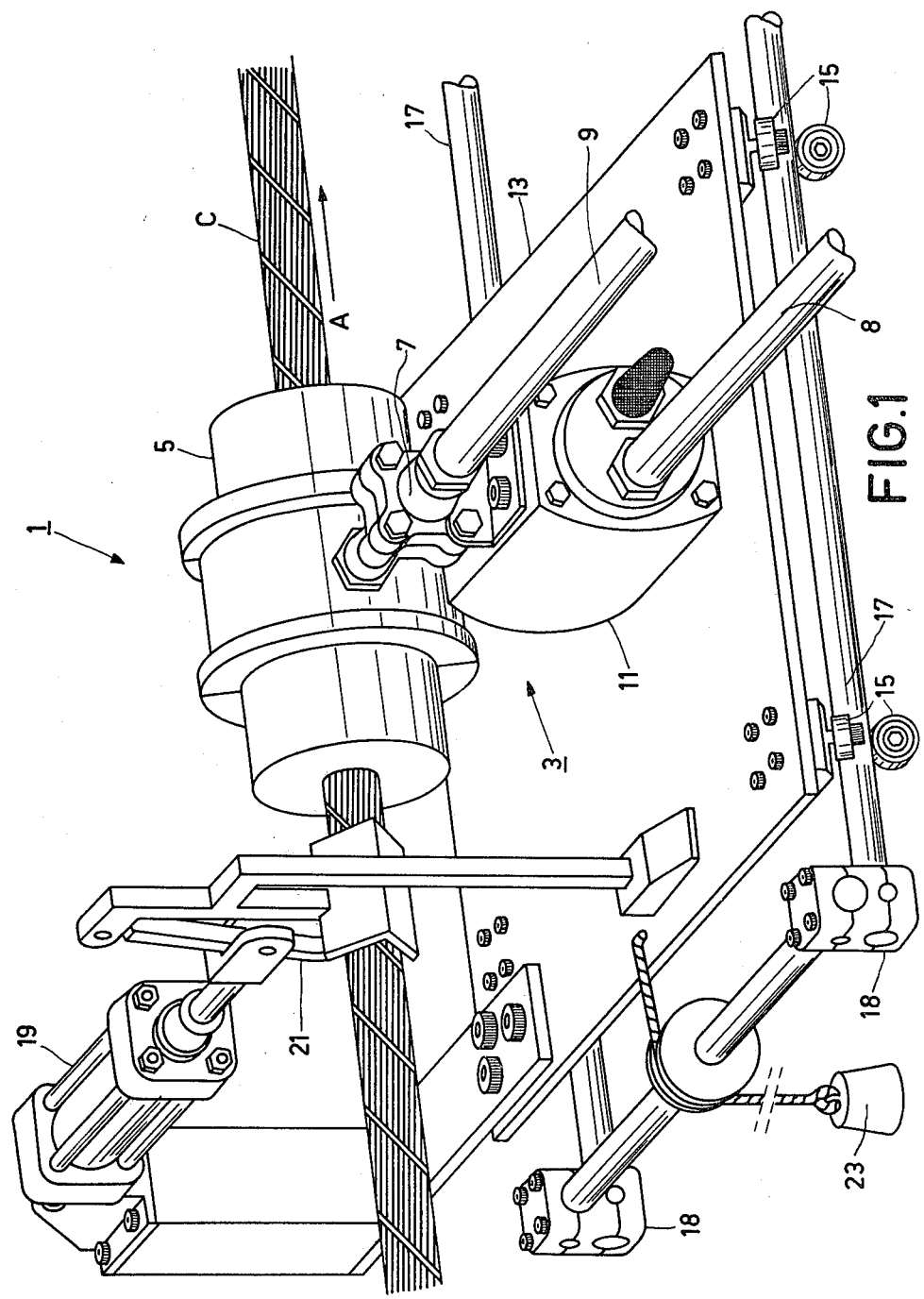
FIG. 1 is a perspective view of a first embodiment of the invention.
Figure 2:
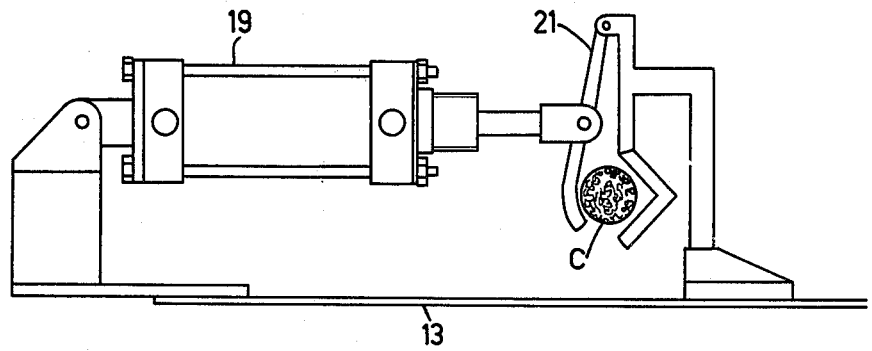
FIG. 2 is a front view of a part of the device.

The device 1 shown in the FIGS. 1 to 4 comprises an injection head 3 with a nozzle 5 which is connected, via a pneumatically controlled supply valve 7, to a supply duct 9 for supplying sealing material to be injected. An electromagnetic valve 11 serves for the pneumatic control of the supply valve 7 and is connected to a compressed air duct 8. The injection head 3 is mounted on a slide 13 which is journalled to be displaceable, by means of rollers 15, on guides 17 which are mounted on a frame 18 and which extend parallel to the traveling direction of the cable core C to be rendered watertight. Also mounted on the slide 13 are a pneumatic unit 19 and a clamping mechanism 21 which acts as a driving element and which is controlled by means of the unit 19. Counterweight 23 serves to return the slide 13 to its starting position.

Figure 3:
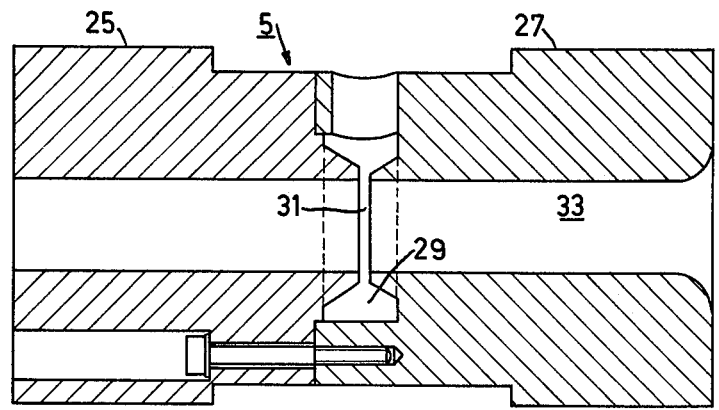
FIG. 3 is a longitudinal sectional view of an embodiment of the nozzle.

FIG. 3 is a longitudinal sectional view of an embodiment of the nozzle 5 which is composed of two parts 25 and 27 and which comprises an annular pressure chamber 29 which is connected to the supply duct 9 and which communicates, via an annular pressure gap 31, with a cylindrical feed-through chamber 33 through which the cable core C passes.

Figures 4, 6:
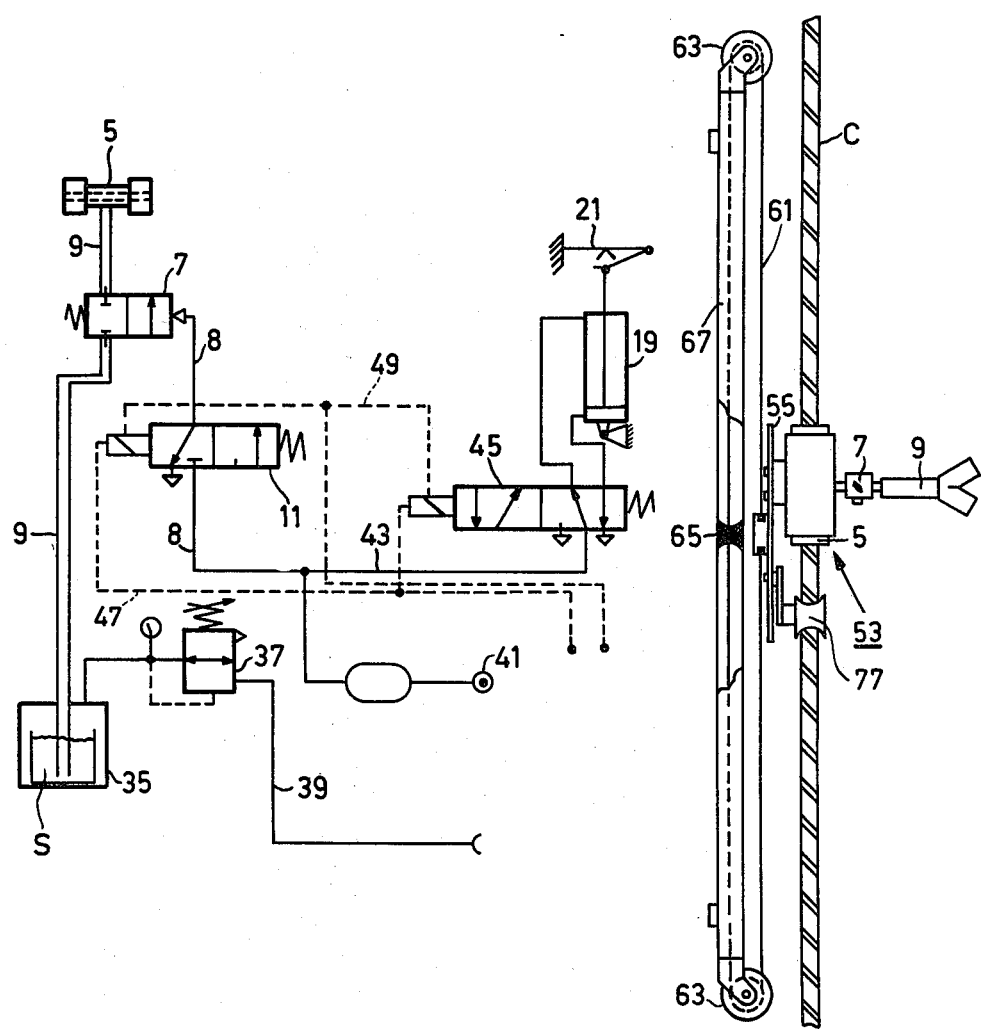
FIG. 4 shows the pneumatic/electrical diagram of the device.
FIG. 6 is a plan view of a part of the device.
Figure 5:
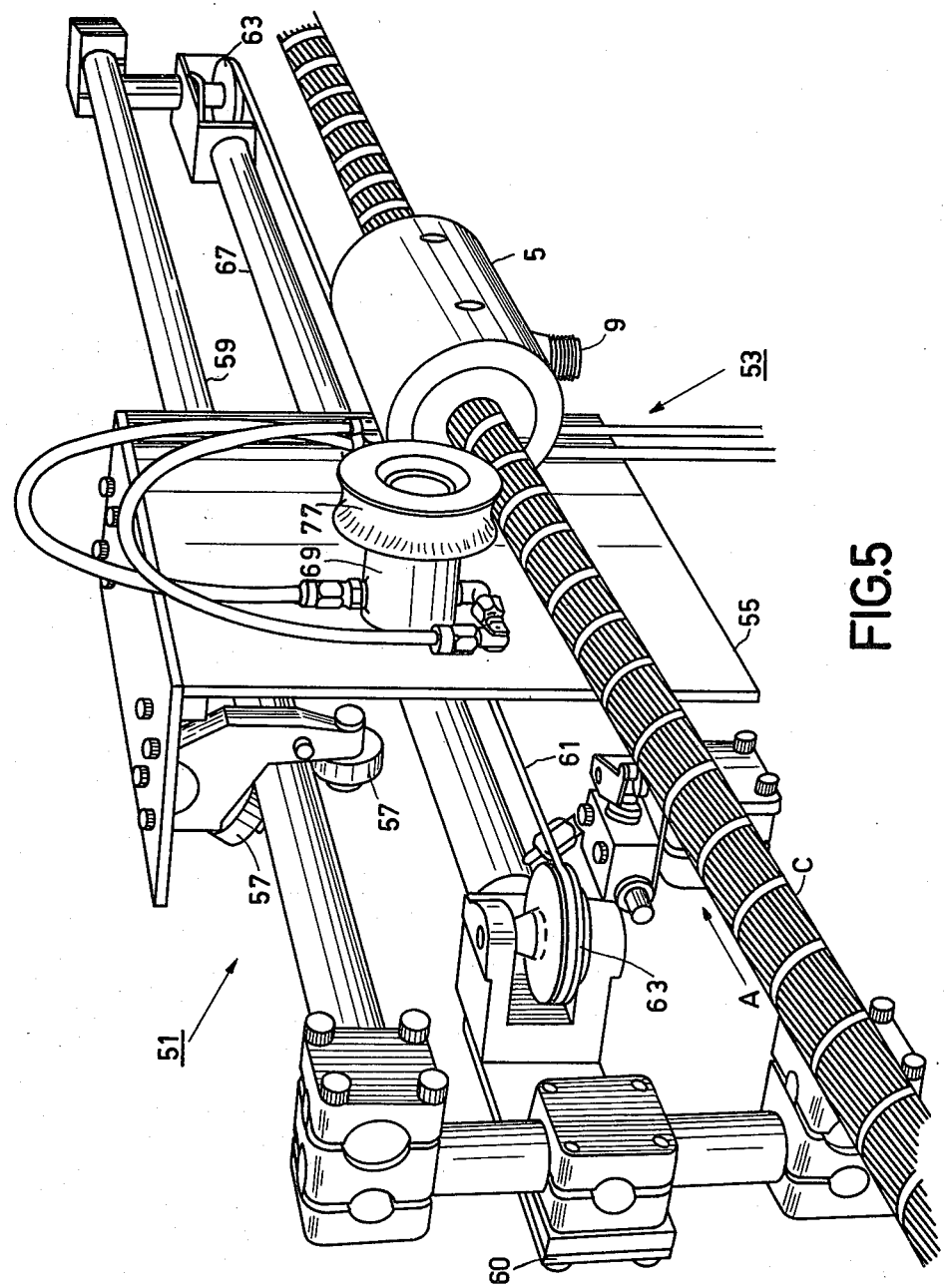
FIG. 5 is a perspective view of a further embodiment of the device.
Figures 7, 8:
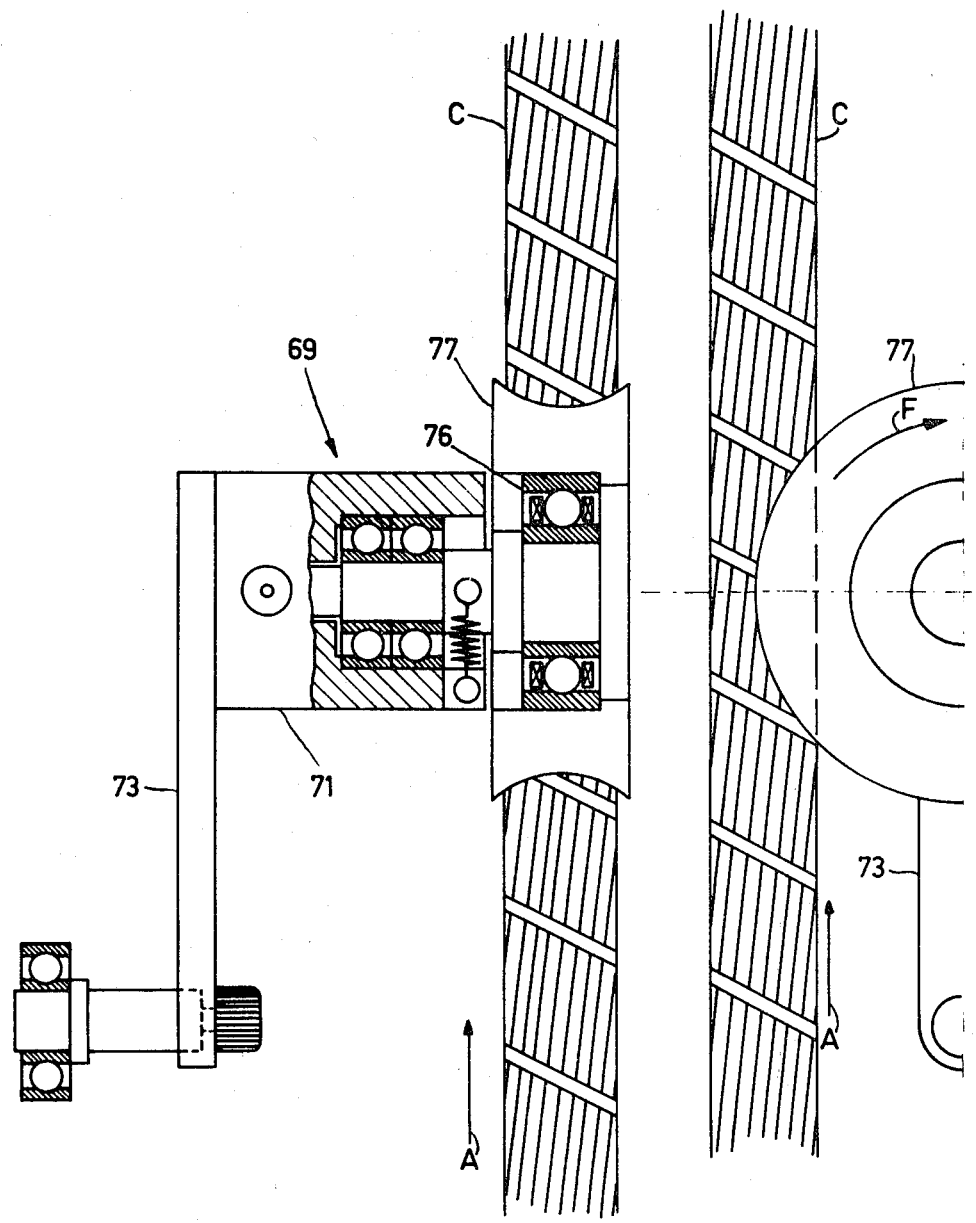
FIGS. 7 and 8 are a sectional view and a side elevation, respectively, of a part of the device.

FIG. 4 shows the pneumatic/electrical diagram of the device. The reference numeral 35 denotes a pressure vessel which contains the sealing material S and which is connected, via a valve 37, to a feed duct 39 for a pressure fluid like air or nitrogen. Via the supply duct 9 and the supply valve 7, the pressure vessel 35 is connected to the nozzle 5. The reference numeral 41 denotes a compressed air supply unit which is connected, via the compressed air duct 8, to the electromagnetic valve 11. Via a compressed air duct 43, compressed air is applied to an electromagnetic valve 45 which serves to control the pneumatic unit 19. The reference numerals 47 and 49 denote the electrical leads which are connected to the electromagnetic valves 11 and 45.

The operation of the device is as follows. For rendering the stranded cable core C longitudinally watertight, sealing material is introduced block-wise under pressure into and around the cable core, preferably at regular distances in the longitudinal direction of the cable core, during movement of the cable core. Utilizing a length measuring instrument which senses the cable core in combination with an electrical pulse generator (these elements are not shown), the supply valve 7 is opened for a given period of time via the actuated electromagnetic valve 11 and by means of an air impulse. Simultaneously with the supply valve, the pneumatic unit 19 acts via the actuated electromagnetic valve 45, with the result that the clamping mechanism 21 clamps the cable core C so that the slide 13 with the injection head 3 and the nozzle 5 is taken along by and in synchronism with the cable core. During this time, sealing material S is fed under pressure to the nozzle 5 via the supply valve 7. By the nozzle 5, the sealing material is regularly distributed around the cable core and penetrates into the center of the cable core to form a watertight block.

After the cable core has been sufficiently filled with sealing material, the actuation of electromagnetic valves 11 and 45 is stopped, so that the supply valve 7 returns to its rest position and closes the supply duct 9, the pneumatic unit 19 is returned to the rest position, and the clamping mechanism 21 releases the cable core C. Under the influence of the counterweight 23, the slide 13 returns to its starting position. The device is now ready for a next process operation.

Figure 9:
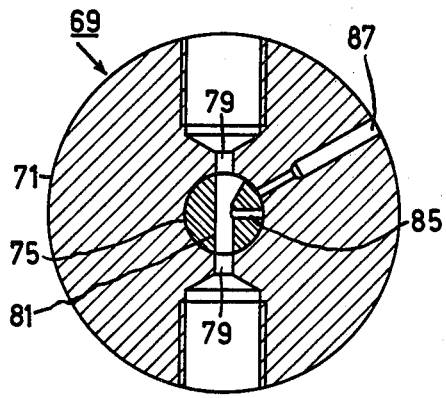
FIGS. 9 and 10 are sectional views of the throttling valve in the rest position and the vent position, respectively.
Figure 10:
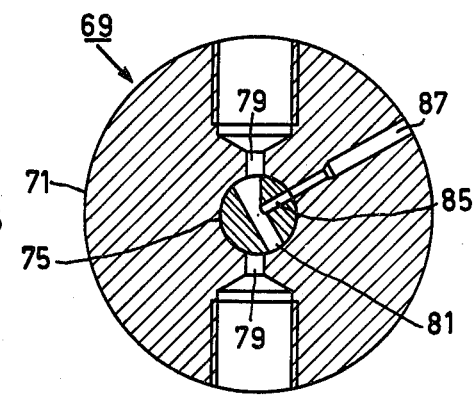
Figure 11:
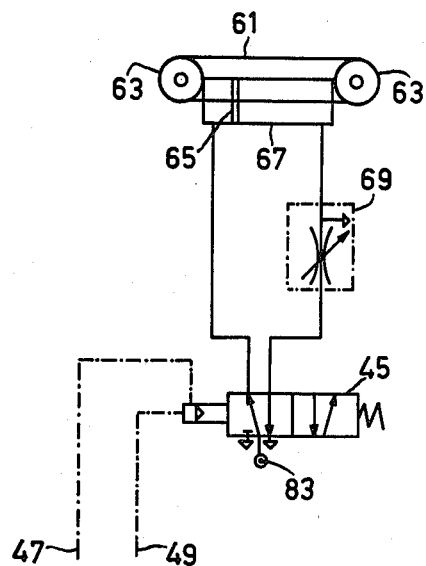
FIG. 11 shows part of the pneumatic/electrical diagram of the device.

The FIGS. 5 to 11 show a further embodiment of the device in which the elements which are identical in both embodiments are denoted by the same reference numerals. The device 51 comprises an injection head 53 with a nozzle 5. The injection head 53 is mounted on a slide 55 which is journalled, by means of rollers 57, on guides 59 which form part of a frame 60 and which extend parallel to the travelling direction of the cable core C to be rendered watertight. Via a cord or cable 61 which is guided on pulleys 63, the slide 55 is coupled to a piston 65 of a pneumatic unit 67 which is mounted on the frame. The reference numeral 7 denotes the supply valve for controlling the supply of the sealing compound and the reference numeral 9 denotes the supply duct. The reference numeral 69 denotes a throttling valve which comprises a housing 71 which is pivotably journalled on the slide 55 by way of an arm 73. A rotating valve 75 is rotatably journalled in the housing 71. A wheel 77 which senses the cable core C is journalled, by means of a free wheel 76, on a freely projecting part of the rotating valve 75. The housing 71 and the rotating valve 75 comprise air ducts 79 and 81, respectively, the housing being connected on the one side to a compressed air source 83 and on the other side to the pneumatic unit 67. When electromagnetic valve 45 is actuated, compressed air can be applied to the pneumatic unit via the throttling valve 69. The housing 71 and the rotating valve 75 also comprise vent ducts 85 and 87, respectively. The operation of the device is as follows:

As in the device described above, the supply valve 7 is opened for a given period of time. At the same time the pneumatic unit 67 is pneumatically actuated via the electromagnetic valve 45, so that the injection head 53 is displaced by the piston 65, together with the nozzle 5 and the wheel 77, that is to say with a predetermined starting speed. This starting speed is chosen to be higher than the linear speed of the cable core C. Due to the resultant speed difference, the wheel 77 produces a relative rotation of the rotating valve 75 and the housing 71. As a result, the supply of air to the pneumatic unit 67 by the throttling valve 69 is reduced until the speeds of the cable core C and the piston 65 are equal, so that the speed of the nozzle 5 is quickly synchronized with the linear speed of the cable core C. Fluctuations of the speed of the cable core immediately initiate control of the throttling valve 69, so that the speed of the piston 65 is directly adapted again to that of the cable core. Thanks to the vent ducts 85 and 87 in the throttling valve, overshooting of the piston 65 is prevented even when the difference between the constant, permanently adjusted starting speed of the piston 65 and the speed of the cable core is very large. The vent ducts 85 and 87 enable the pneumatic unit to be quickly vented temporarily, so that the speed difference is very quickly eliminated. FIG. 9 shows the throttling valve 69 in the rest position or the position which corresponds to the starting speed of the piston 65. FIG. 10 shows the throttling valve 69 in a vent position in which the supply of air is fully choked. Between two injections, the wheel 77 rotates freely thanks to the free wheel 76, without influencing of the throttling valve 69. The free wheel direction of the wheel 77 is denoted by the arrow F in FIG. 8. The travel direction of the cable core C is denoted by the arrow A in the drawing. The further operation of the device 51, such as the termination of the injection, is identical to that of the already described device 1.

What is claimed is:

1. A device for rendering a cable comprising a stranded core longitudinally watertight by the blockwise application under pressure of sealing material in and around the stranded cable core, while said cable core is longitudinally advancing, said device comprising an injection head which can be intermittently displaced in the longitudinal direction of the cable by means of a guide in synchronism with the speed of advancement of the cable core and which also comprises a feed-through chamber which is connected to a supply duct for the sealing material, the supply of which material is dosed by means of a supply valve, characterized in that the synchronized controlled displacements of the injection head are provided in the device by a drive mechanism comprising a driving element which is coupled to the injection head and which is controlled by a pneumatic unit connected to a compressed air duct including a control valve.

2. A device as claimed in claim 1, characterized in that the driving element is a clamping means which intermittently cooperates with the cable core to be rendered longitudinally watertight.

3. A device as claimed in claim 1, characterized in that the driving element is formed by a driven piston means of the pneumatic unit.

4. A device as claimed in claim 3, characterized in that it comprises a throttling valve which is arranged in the compressed air duct between the control valve and the pneumatic unit and which is controlled by a wheel which senses the cable core.

5. A device as claimed in claim 4, characterized in that the throttling valve comprises a vent duct.

6. A device as claimed in any of the claims 1 to 5, characterized in that the injection head comprises a nozzle with a pressure chamber which is connected to the supply duct and which communicates with the feed-through chamber.

* * * * *